United States Patent [19]
Olson, Sr.

[11] 4,129,016
[45] Dec. 12, 1978

[54] UNIVERSAL JOINT CROSS
[75] Inventor: Dean A. Olson, Sr., Rockford, Ill.
[73] Assignee: Rockford Acromatic Products Co., Rockford, Ill.
[21] Appl. No.: 827,562
[22] Filed: Aug. 25, 1977
[51] Int. Cl.² ............................................. F16D 3/30
[52] U.S. Cl. ................................................ 64/17 A
[58] Field of Search ........................... 64/17 A, 17 R
[56] References Cited
U.S. PATENT DOCUMENTS

| 771,637 | 10/1904 | Hoffmann | 64/17 A |
|---|---|---|---|
| 3,119,246 | 1/1964 | Koch | 64/17 A |

FOREIGN PATENT DOCUMENTS

| 878997 | 10/1961 | United Kingdom | 64/17 A |
|---|---|---|---|

Primary Examiner—Benjamin W. Wyche
Assistant Examiner—R. C. Turner
Attorney, Agent, or Firm—Leydig, Voit, Osann, Mayer & Holt, Ltd.

[57] ABSTRACT

The cross includes four angularly spaced and outwardly projecting bearing assemblies each comprising a trunnion, an annular row of elongated rollers, and a bearing cup having a cavity which receives the rollers. The rollers of each bearing assembly are convexly crowned along their lengths so that forces transferred between the bearing cup and the trunnion are transmitted through each roller at a pressure area along the midportion thereof, the pressure area spreading or expanding as the forces increase. In a modified embodiment, the trunnion of each bearing assembly is convexly crowned.

3 Claims, 4 Drawing Figures

UNIVERSAL JOINT CROSS

BACKGROUND OF THE INVENTION

This invention relates to a universal joint cross of the type having a body and having four bearing assemblies spaced angularly around and projecting outwardly from the body, each bearing assembly including an inner trunnion. A bearing cup is telescoped over each trunnion and is journaled thereon by an annular row of rollers. The rollers are telescoped into the cavity of the cup in surrounding relation with the trunnion.

When torque is applied to the cross, force is transmitted between each trunnion and the surrounding cup by way of the rollers. If the torque is constant along the length of the bearing assembly, the force exerted at the inner end of the bearing assembly is greater than that exerted at the outer end thereof.

SUMMARY OF THE INVENTION

The general aim of the present invention is to provide a new and improved universal joint cross in which the forces transferred between the bearing cup and trunnion of each bearing assembly are transmitted through each roller at a pressure area adjacent the midportion thereof so as to enable the bearing cup, the trunnion and the rollers to wear more uniformly and to experience a longer service life than the corresponding components of prior universal joint crosses.

Another object is to achieve the foregoing by providing a universal joint cross having unique rollers which are convexly crowned along their lengths so that forces are transmitted through each roller at a pressure area located along the midportion of the roller, the pressure area spreading toward the ends of the rollers as the forces increase in magnitude.

Still another object of the invention is to provide a universal joint cross in which each trunnion also is convexly crowned along its length and defines a pressure area which spreads as the forces applied to the bearing assembly increase.

These and other objects and advantages of the invention will become more apparent from the following detailed description when taken in conjunction with the accompanying drawings.

DETAILED DESCRIPTION OF THE PREFERRED EMBODIMENTS

Figure 1:
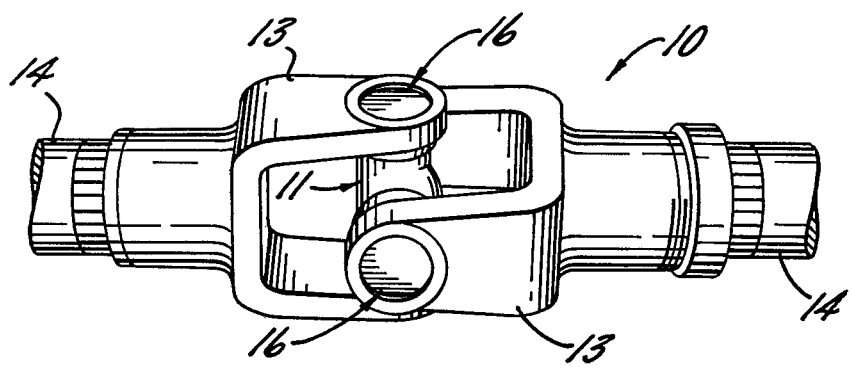
FIG. 1 is a perspective view of a typical universal joint equipped with a new and improved cross incorporating the unique features of the present invention.

For purposes of illustration, the invention is shown in the drawings as incorporated in a universal joint 10 having a cross 11 and having two right angular yokes 13 which are interconnected by the cross, each yoke being adapted for connection to a rotary shaft 14. The cross 11 comprises a central body 15 (FIG. 2) and further comprises four bearing assemblies 16 spaced angularly around and projecting outwardly from the body. One of the yokes is connected to one pair of diametrically spaced bearing assemblies while the other yoke is connected to the remaining two bearing assemblies.

Each bearing assembly 16 comprises a trunnion 17 which is formed integrally with the body 15. Telescoped over each trunnion is a bearing cup 19 formed with a cavity 20 (FIG. 3) which receives the trunnion, there being an annular row of rollers 21 telescoped into the cavity in surrounding relation with the trunnion. The bearing cups are connected to the yokes 13 and are rotatably journaled on the trunnions by the rollers. A ring 23 of elastomeric material is fitted around the open end of each cup and retains the rollers in the cup, the ring also serving as a lubricant seal.

When the yokes 13 are rotated and torque is applied to the cross 11, the force exerted on the inner end of each bearing assembly 16 is greater than the force exerted on the outer end thereof since the distance or radius between the center of the cross and the inner end of the bearing assembly is less than the distance between the center of the cross and the outer end of the bearing assembly. In accordance with the present invention, each roller 21 is uniquely crowned in a lengthwise direction so that the forces applied to each bearing assembly 16 are transmitted between the bearing surfaces of the trunnion 17, the bearing cup 19 and the rollers at a pressure region along the midportion of the bearing assembly. Because of the crowned shape of the rollers, the pressure region expands or spreads in a lengthwise direction as the applied forces increase in magnitude. The crowned rollers thus prevent the bearing surfaces from wearing by a greater amount at the inner end of each bearing assembly than at the outer end thereof and enable the cross 11 to experience a longer service life than prior crosses which utilize conventional cylindrical rollers.

Figure 2:
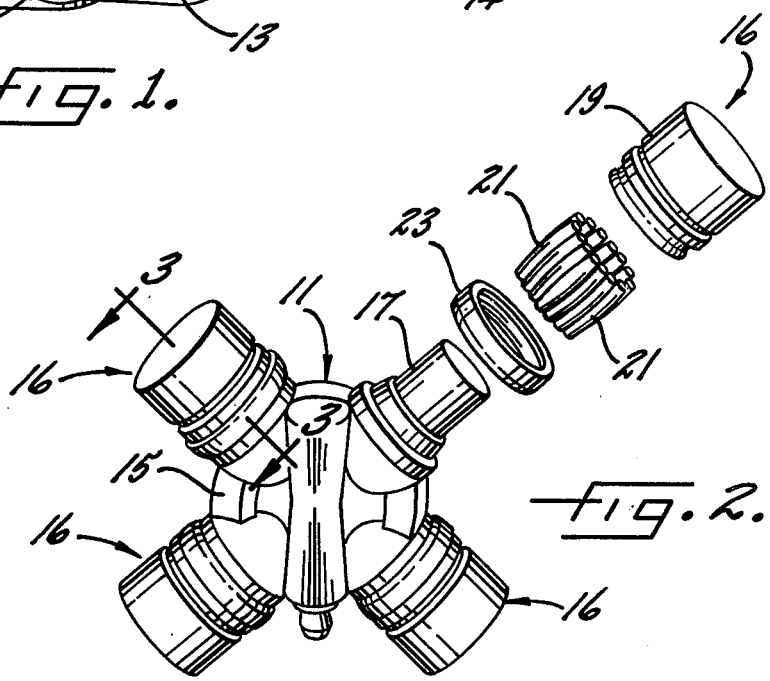
FIG. 2 is a perspective view of the cross with one of the bearing assemblies being shown in an exploded manner.
Figure 3:
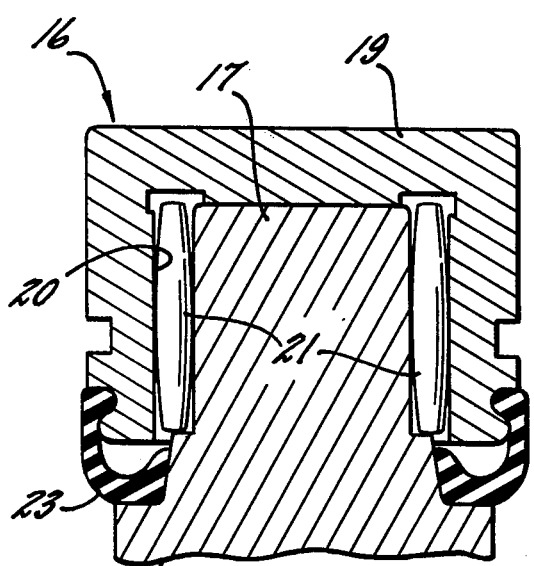
FIG. 3 is an enlarged fragmentary cross-section taken substantially along the line 3—3 of FIG. 2.

In the embodiment of the cross 11 shown in FIGS. 1 to 3, the trunnion 17 of each bearing assembly 16 is cylindrical as in the case of a conventional cross. The cavity 20 of each bearing cup 19 also is cylindrical. Each roller 21 is of circular cross-section and, in carrying out the invention, each roller is convexly crowned in a longitudinal direction and is crowned symmetrically from its midpoint to each of its ends. Herein, the diameter of each roller at the midpoint thereof is between 0.0002" and 0.0004" greater than the diameter of each end of the roller.

Being crowned, each roller 21 defines a curved bearing surface which is similar to the pressure surface of a Gleason gear. Forces applied to each bearing assembly 16 are transmitted through each roller within a pressure area at the midportion of the roller. When the forces increase, the pressure area spreads or expands both circumferentially and axially in a manner similar to the Gleason gear principle. Rather than being exerted unequally at the inner and outer ends of the bearing surfaces, the forces are transferred through the midportion of each roller and are distributed in such a manner as to reduce unequal wear of the bearing surfaces.

Figure 4:
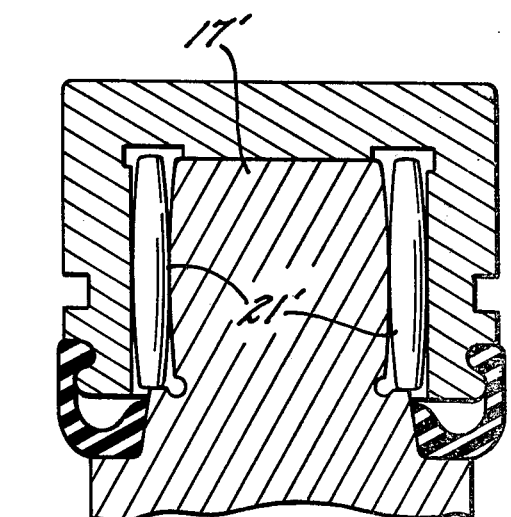
FIG. 4 is a view similar to FIG. 3 but shows a modified cross.

A modified cross 11' is shown in FIG. 4 in which each trunnion 17' also is crowned convexly in a longitudinal direction rather than being cylindrical. Crowned rollers 21' also are employed in the modified cross and coact with the crowned trunnion to cause the pressure area to expand as the applied forces increase.

I claim:

1. A universal joint cross having a central body, four trunnions spaced angularly around and extending outwardly from said body, each of said trunnions being of circular cross-section, a bearing cup telescoped over each trunnion, each of said bearing cups having a cavity of circular cross-section, and an annular row of elongated rollers located within each bearing cup and surrounding each trunnion, each of said rollers being of circular cross-section and each being convexly crowned in a longitudinal direction and symmetrically from its midpoint toward each of its ends.

2. A universal joint cross as defined in claim 1 in which each trunnion is cylindrical and in which the cavity of each bearing cup is cylindrical.

3. A universal joint cross as defined in claim 1 in which the cavity of each bearing cup is cylindrical, each trunnion being convexly crowned in a longitudinal direction.

* * * * *